US009127553B2

(12) United States Patent
DiCintio et al.

(10) Patent No.: US 9,127,553 B2
(45) Date of Patent: Sep. 8, 2015

(54) METHOD, SYSTEMS, AND APPARATUSES FOR TRANSITION PIECE CONTOURING

(75) Inventors: Richard Martin DiCintio, Simpsonville, GA (US); Patrick Benedict Melton, Horse Shoe, NC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 13/446,751

(22) Filed: Apr. 13, 2012

(65) Prior Publication Data

US 2013/0269820 A1    Oct. 17, 2013

(51) Int. Cl.
*F01D 9/02*    (2006.01)

(52) U.S. Cl.
CPC ............ *F01D 9/023* (2013.01); *F05D 2230/00* (2013.01); *F05D 2250/70* (2013.01)

(58) Field of Classification Search
CPC ................ F01D 9/023; F05D 2250/70; F05D 2260/2214; F05D 2260/231; F23R 3/002; F23R 3/005; F23R 2900/0018

USPC ............. 415/134, 135, 136, 138, 185, 208.2; 60/752–760, 805, 806; 29/889.2, 29/889.21, 889.22

See application file for complete search history.

(56) References Cited

U.S. PATENT DOCUMENTS

| 2005/0091987 | A1* | 5/2005 | Tiemann et al. | 60/800 |
| 2009/0151360 | A1* | 6/2009 | Burd et al. | 60/748 |
| 2011/0061393 | A1* | 3/2011 | Jorgensen | 60/752 |
| 2011/0265491 | A1* | 11/2011 | Nakamura et al. | 60/796 |
| 2012/0324897 | A1* | 12/2012 | Mcmahan et al. | 60/752 |

OTHER PUBLICATIONS

U.S. Appl. No. 13/446,718, filed Apr. 13, 2012, DiCintio.
U.S. Appl. No. 13/446,831, filed Apr. 13, 2012, DiCintio.

* cited by examiner

*Primary Examiner* — Jesse Prager

(57) ABSTRACT

Disclosed herein are apparatuses, methods, and systems for transition piece contouring. In an embodiment, a high thermal stress section of a transition piece and a low thermal stress section of a transition piece is a determined. The low thermal stress section of the transition piece may be contoured to intercept hot gas flow.

7 Claims, 4 Drawing Sheets

METHOD, SYSTEMS, AND APPARATUSES FOR TRANSITION PIECE CONTOURING

CROSS REFERENCE TO RELATED APPLICATIONS

The subject matter disclosed in this patent application is related to the subject matter disclosed and claimed in the following U.S. patent application Ser. No. 13/446,718, and U.S. patent application Ser. No. 13/446,831. Each of the above U.S. patent applications were filed on even day herewith and are incorporated by reference herein in their entirety.

TECHNICAL FIELD

The subject matter disclosed herein relates generally to combustion systems and more specifically hot gas flow.

BACKGROUND

In a typical can annular gas turbine engine, a plurality of combustors are arranged in a generally annular array about the engine. The combustors receive pressurized air from the engine's compressor, adds fuel to create a fuel and air mixture, and combusts that mixture to produce hot gases. The hot gases exiting the combustors are utilized to turn a turbine, which is coupled to a shaft that drives a generator for generating electricity.

The hot combustion gas is conveyed from the combustor liner to the turbine by a transition piece or duct. The hot combustion gas flowing through the transition piece subjects the duct structure to very high temperatures and can lead to premature deterioration that requires repair and replacement of the transition ducts. A significant crack or other deterioration in a single area of an otherwise relatively undamaged transition piece may have a significant impact on the gas turbine performance and may require replacement of the entire transition piece.

BRIEF DESCRIPTION OF THE INVENTION

Disclosed herein are apparatuses, methods, and systems for transition piece contouring. In an embodiment, a method determines a first area for a first transition piece, wherein the first area for the first transition piece is a high thermal stress section of the first transition piece, determines a second area for the first transition piece, wherein the second area for the first transition piece is a low thermal stress section of the first transition piece, determines a contour of the second area for the first transition piece, wherein the determined contour intercepts hot gas flow; and creates the first transition piece with the determined contour of the second area for the first transition piece.

In an embodiment, a transition piece may have a first area that is a high thermal stress section of the transition piece; and a contour that is upstream from the first area and is implemented at a second area, wherein the second area was the low thermal stress section of the transition piece before the implementation of the contour.

In an embodiment, a system a first processor adapted to execute computer-readable instructions; and a first memory communicatively coupled to said first processor, said first memory having stored therein computer-readable instructions that, if executed by the first processor, cause the processor to perform operations including determining a first area, wherein the first area is a high thermal stress section of a transition piece, determining a second area, wherein the second area is a low thermal stress section of the transition piece, contouring the second area, wherein the contoured second area is determined based on analysis of the contour decreasing the thermal stress on the first area, and creating parameters for a physical transition piece based on the contour of the second area for the transition piece.

This Brief Description of the Invention is provided to introduce a selection of concepts in a simplified form that are further described below in the Detailed Description. This Brief Description of the Invention is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF THE INVENTION

Figure 1:
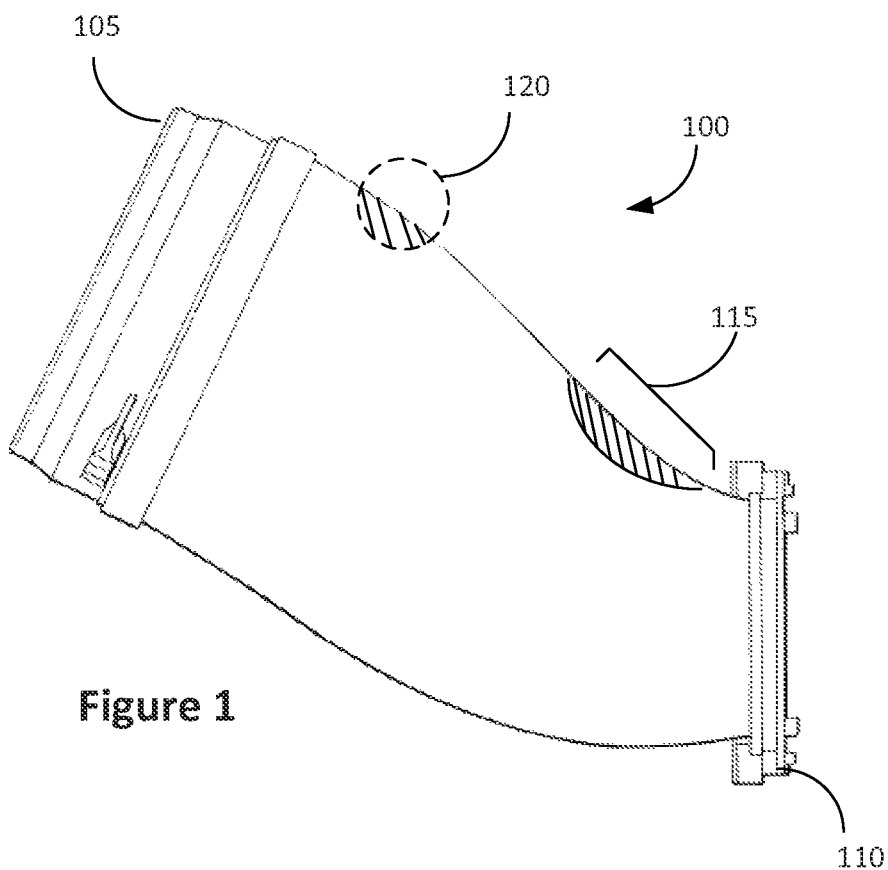
FIG. 1 is an exemplary illustration of a transition piece.

FIG. 1 is an exemplary illustration of a transition piece 100. Transition piece 100 has a forward (inlet) end 105 and an aft (outlet) end 110. Hot gases flow into inlet 105 and flow through the length of transition piece 100. The hot gases exit transition piece 100 at outlet 110. Transition piece 100 has a bend or dip 115. Bend 115 may be a life limiting section of the transition piece because hot gases flowing from the inlet 105 directly impinge on the contour of bend 115. An area 120 may be relatively undamaged when the bend area 115 cracks to a point where replacement of the entire transition piece 100 is needed.

Computational fluid dynamics and other analysis have shown that the life limiting area of a transition piece often has higher temperatures placed on it than other areas of the transition piece. These higher temperatures may cause a higher strain range for every start to stop cycle of the turbine. Over time, these strain cycles will accumulate and become the transition piece's life limit. Life limit may be reached as a result of higher thermal stress and oxidation caused by higher temperatures. Over time, oxidation may accumulate and become the transition piece's life limit. As stated herein, regardless of the relatively undamaged nature of the other portions of the transition piece, the entire transition piece is replaced when significant damage (e.g., cracking) has occurred to a particular area of the transition piece.

Figure 2:
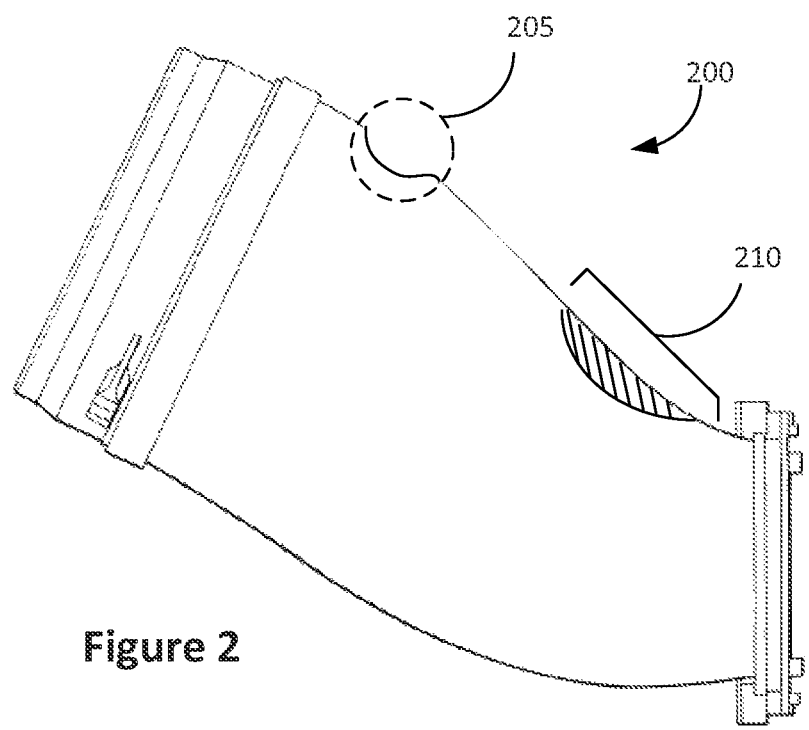
FIG. 2 is an exemplary illustration of a transition piece implementing transition piece contouring.

One or more contours or dips may be used in traditionally less damaged parts of the transition piece in order to spread out the damage done to the transition piece and therefore prolong the service life of the entire transition piece. The contour can be subtle or extreme. FIG. 2 is an exemplary illustration of a modified area 205 of a transition piece 200. In an embodiment as shown in FIG. 1, area 120 may be the coolest and least damaged portion of transition piece 100. In an embodiment as shown in FIG. 2, modified area 205 may take more damage than traditionally taken in a similar area, but may also decrease the damage typically taken by bend area 210.

Gas turbine engine designs vary so design-of-experiments (DOE) methods for combining sets of computational fluid dynamics (CFD) and other analysis techniques may be used to optimize the various geometries (e.g., number and depth of dips) that maximize the results for the particular system. For example, in FIG. 1, CFD analysis may show that area 120 is comparatively very cool compared to bend 115 and therefore may be considered to have lots of life. CFD optimization may be used to analyze the effect of different contours of area 120 that may take some of the impact of the hot gas flow, which would reduce the impact of the hot gas flow on the bend 115 of transition piece 100.

Intentionally dipping or contouring the "cool" end is traditionally considered detrimental because the manipulated area may have a more aggressive curve, but, as disclosed herein, the damage done by hot gases may be spread to other cool areas of the transition piece and may increase the life of the entire transition piece. When there is a significant range of life between one area of the transition piece and another, altering the contour in a higher life area may be implemented to bring the life of the other low life area up. Manipulation of the top surface of the transition piece is disclosed herein, but manipulation of any side is contemplated.

A transition piece as mentioned herein may be a physical manifestation (e.g., metal) or a computer generated representation of a transition piece in a turbine system. Test of the transition piece may be done using physical transition pieces with test equipment, computer specifications of a transition piece and corresponding computer analysis, or the like. Tests may be done on a particular transition piece design, such as a transition piece made for one or more generator models, and implemented into a physical form or digital representation of a physical transition piece. Simulations of hot gas flow and thermal stress of a transition piece, for example, may be done using measurements from implementations of transition pieces.

Figure 3:
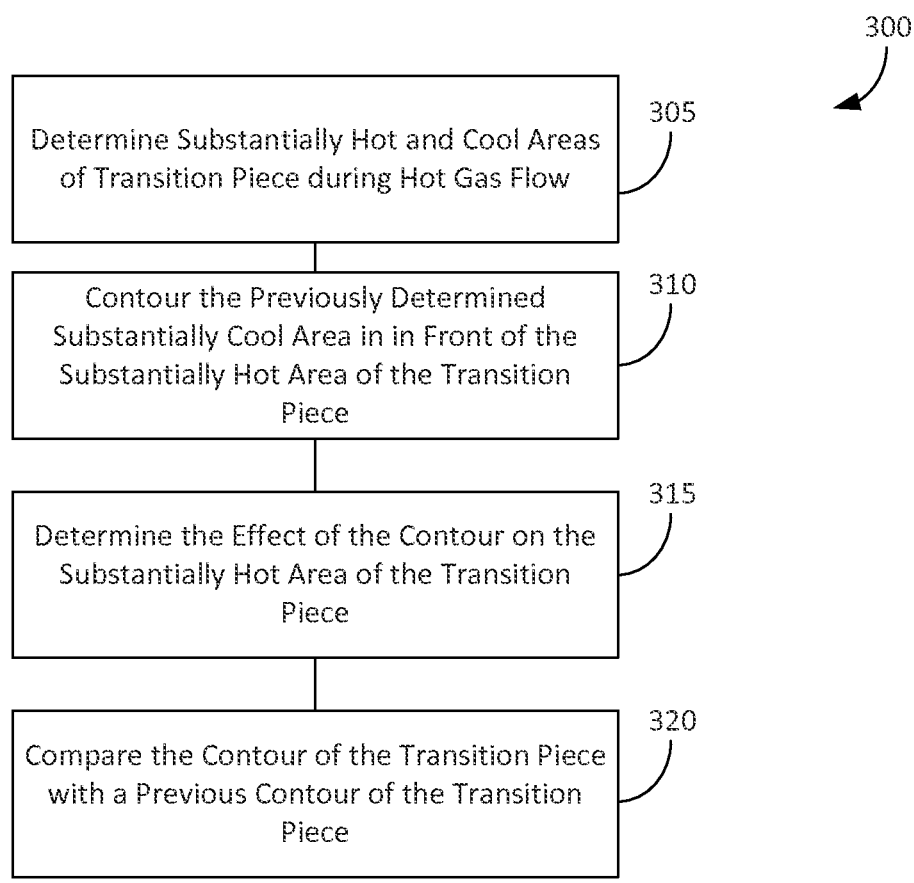
FIG. 3 illustrates a non-limiting, exemplary method of implementing transition piece contouring.
Figure 4:
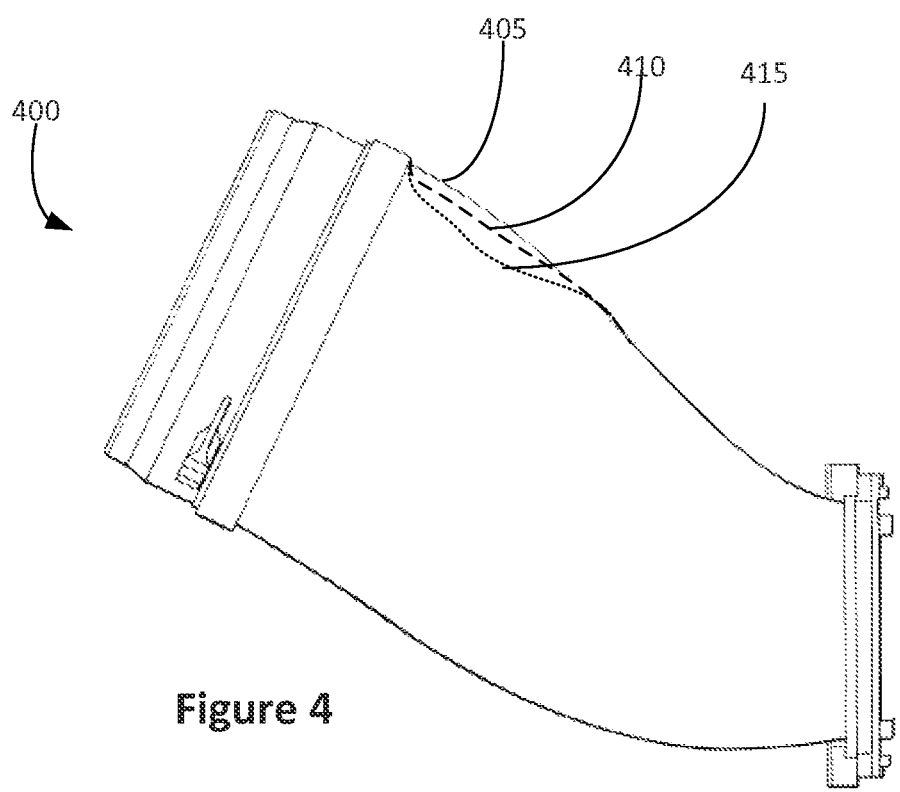
FIG. 4 is a transition piece with exemplary contours.

FIG. 3 illustrates a non-limiting, exemplary method of implementing preferential contouring of a transition piece. Method 300 may be performed as a whole or in part by computing equipment. In an embodiment at block 305, the transition piece may be analyzed to determine the hot and relatively cool spots of the transition piece during the flow of hot gas through the transition piece. After the hot and cool areas of the transition piece are determined, at block 310, the cool area of the transition piece may be incrementally dipped into the path of the hot gas flow in order to increase the exposure of the cool surface and decrease the exposure of the hot surface. After an incremental dip of the cool surface, at block 315, the effect of the incremental dip is determined. At block 320, a comparison of the contour of the transition piece with a previous contour of the transition piece may be done. The optimal dip may be determined based on the analysis of the hot gas flow through the transition piece. Analysis may be done by CFD. FIG. 4 is a transition piece 400 with exemplary contours. Line 405 is the original shape or contour of the transition piece 400. Dotted lines 410 and 415 are exemplary modified contours of the transition piece 400.

Figure 5:
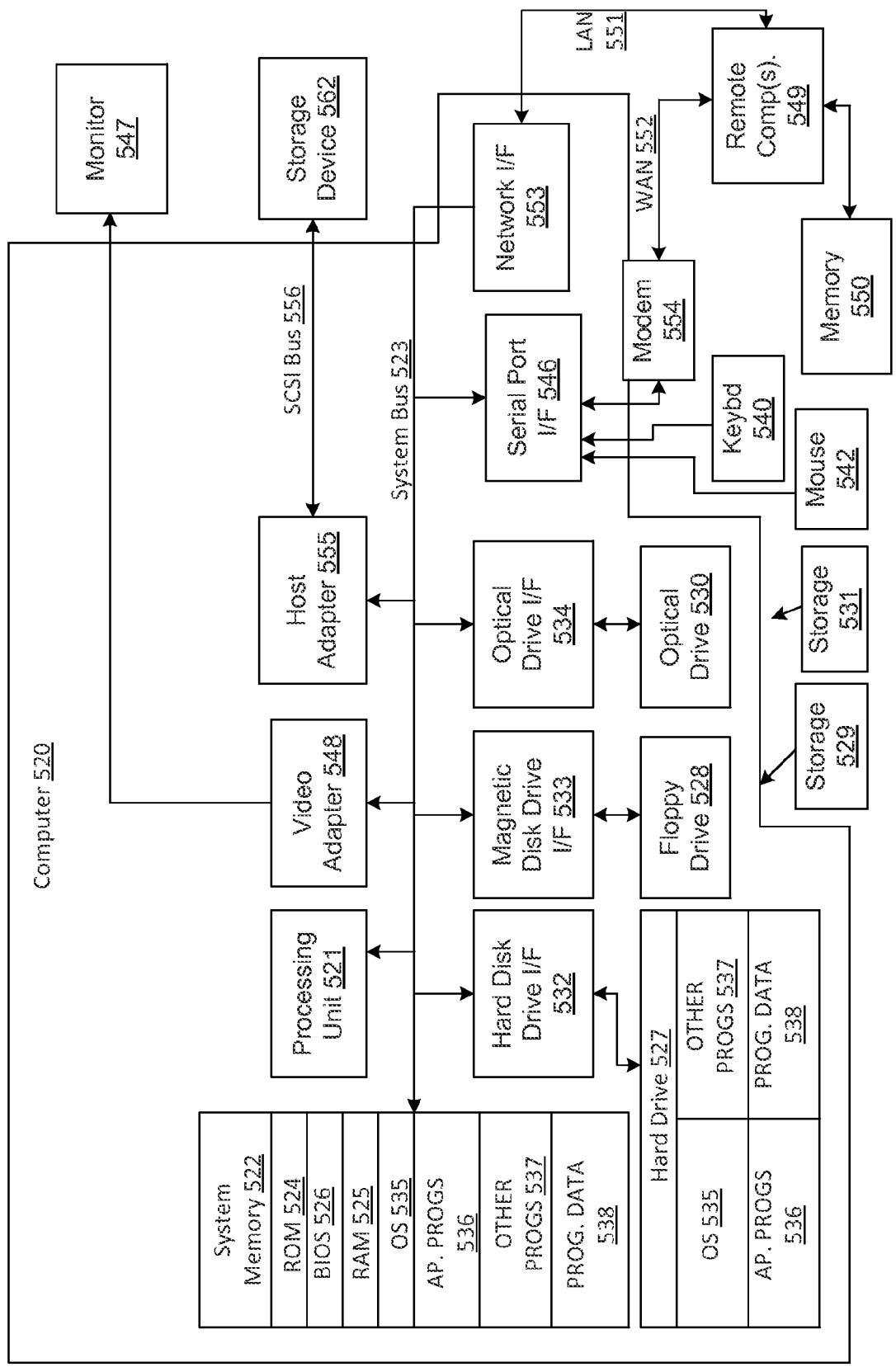
FIG. 5 is an exemplary block diagram representing a general purpose computer system in which aspects of the present invention thereof may be incorporated.

FIG. 5 and the following discussion are intended to provide a brief general description of a suitable computing environment in which the methods and systems disclosed herein and/or portions thereof may be implemented. Although not required, the methods and systems disclosed herein may be described in the general context of computer-executable instructions, such as program modules, being executed by a computer, such as a client workstation, server, or personal computer. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 5 is a block diagram representing a general purpose computer system in which aspects of the present invention and/or portions thereof may be incorporated. As shown, the exemplary general purpose computing system includes a computer 520 or the like, including a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system 526 (BIOS), containing the basic routines that help to transfer information between elements within the computer 520, such as during start-up, is stored in ROM 524.

The computer 520 may further include a hard disk drive 527 for reading from and writing to a hard disk (not shown), a magnetic disk drive 528 for reading from or writing to a removable magnetic disk 529, and an optical disk drive 530 for reading from or writing to a removable optical disk 531 such as a CD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide non-volatile storage of computer readable instructions, data structures, program modules and other data for the computer 520.

Although the exemplary environment described herein employs a hard disk, a removable magnetic disk 529, and a removable optical disk 531, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 529, optical disk 531, ROM 524 or RAM 525, including an operating system 535, one or more application programs 536, other program modules 537 and program data 538. A user may enter commands and information into the computer 520 through input devices such as a keyboard 540 and pointing device 542. Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, a computer may include other peripheral output devices (not shown), such as speakers and printers. The exemplary system of FIG. 5 also includes a host adapter 555, a Small Computer System Interface (SCSI) bus 556, and an external storage device 562 connected to the SCSI bus 556.

The computer 520 may operate in a networked environment using logical connections to one or more remote computers, such as a remote computer 549. The remote computer 549 may be a personal computer, a server, a router, a network PC, a peer device or other common network node, and may include many or all of the elements described above relative to the computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets, and the Internet.

When used in a LAN networking environment, the computer 520 is connected to the LAN 551 through a network interface or adapter 553. When used in a WAN networking environment, the computer 520 may include a modem 554 or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing a communications link between the computers may be used.

Computer 520 may include a variety of computer readable storage media. Computer readable storage media can be any available media that can be accessed by computer 520 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 520. Combinations of any of the above should also be included within the scope of computer readable media that may be used to store source code for implementing the methods and systems described herein. Any combination of the features or elements disclosed herein may be used in one or more embodiments.

In an embodiment, there may be a system with a first processor adapted to execute computer-readable instructions; and a first memory communicatively coupled to said first processor, said first memory having stored therein computer-readable instructions that, if executed by the first processor, cause the processor to perform operations comprising determining a first area, wherein the first area is a high thermal stress section of a transition piece; determining a second area, wherein the second area is a low thermal stress section of the transition piece; contouring the second area, wherein the contoured second area is determined based on analysis of the contour decreasing the thermal stress on the first area; and creating parameters for a physical transition piece based on the contour of the second area for the transition piece. Parameters, as discussed herein, that may be used in fabricating the physical transition piece, may include general numerical dimensions for the physical transition piece or a numerical location of contours for the physical transition piece. Parameters, as defined herein, may also include graphical drawings of multiple dimensions and view points that display the anticipated manifestation of the fabricated physical transition piece.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method of optimizing a transition piece shape comprising:
    determining a first area for a first transition piece, wherein the first area for the first transition piece is a high thermal stress section of the first transition piece;
    determining a second area for the first transition piece, wherein the second area for the first transition piece is a low thermal stress section of the first transition piece;
    determining a contour of the second area for the first transition piece, wherein the determined contour intercepts hot gas flow; and
    creating the first transition piece with the determined contour of the second area for the first transition piece, further comprising contouring the second area of the first transition piece via an attachment.

2. The method of claim 1, further comprising:
    creating a second transition piece with a first area, wherein the first area of the second transition piece is contoured based on analysis of the second area of the first transition piece.

3. The method of claim 1, wherein the second area of the first transition piece is upstream from the first area of the first transition piece.

4. The method of claim 1, wherein the contoured second area of the first transition piece is positioned on the top portion of the first transition piece.

5. The method of claim 1, wherein the contoured second area of the first transition piece is positioned on the bottom portion of the first transition piece.

6. The method of claim 1, wherein the first transition piece is computer generated representation of a turbine transition piece.

7. The method of claim 2, wherein the contouring of the first area of the second transition piece increases the life of a second area of the second transition piece.

* * * * *